United States Patent [19]
Stanley et al.

[11] 3,909,358
[45] Sept. 30, 1975

[54] INSOLUBILIZED ENZYMES
[75] Inventors: William L. Stanley, El Cerrito; Glenn G. Watters, Albany, both of Calif.
[73] Assignee: The United States of America as represented by the Secretary of Agriculture, Washington, D.C.
[22] Filed: Apr. 29, 1974
[21] Appl. No.: 464,887

[52] U.S. Cl. ............ 195/63; 195/31 R; 195/68; 195/DIG. 11
[51] Int. Cl.² .................................. C07G 7/02
[58] Field of Search ........ 195/63, 68, DIG. 11, 31 R

[56] References Cited
UNITED STATES PATENTS
3,767,531   10/1973   Olson et al. .................. 195/63

OTHER PUBLICATIONS

The Condensed Chemical Dictionary, Van Nostrand Reinhold Company, N.Y., 8th ed., 1971 (p. 194).

Zaborsky, O., Immobilized Enzymes, The Chemical Rubber Co., Cleveland, Ohio, 5/1973 (pp. 71 and 73).

Primary Examiner—David M. Naff
Attorney, Agent, or Firm—M. Howard Silverstein; William Takacs

[57] ABSTRACT

Insolubilized but active enzymes are prepared by reacting an enzyme with chitin and glutaraldehyde.

8 Claims, No Drawings

INSOLUBILIZED ENZYMES

DESCRIPTION OF THE INVENTION

This invention relates to and has among its objects the provision of novel water-insoluble but active enzyme products and methods for preparing them. Further objects of the invention will be evident from the following description wherein parts and percentages are by weight unless otherwise specified.

In recent years there has been considerable interest in preparing enzymes in insolubilized (sometimes referred to as immobilized) form. Such products enable enzyme-catalyzed reactions to be carried out in a simplified and efficient manner. Typically, the insolubilized enzyme is placed in a cylindrical vessel and a solution of the substrate to be reacted is passed through the enzyme column. The reaction takes place within the column and the effluent liquor contains the reaction products. With this system the enzyme can be used repeatedly for processing fresh batches of the substrate. Various techniques have been advocated for preparing insolubilized enzymes. One procedure is to entrap the enzyme in polymerizing polyacrylamide; another is to adsorb it on insoluble media such as ion exchange resins, alumina, etc.

In accordance with the invention, insolubilized but active enzymes are prepared from enzymes which are in a normal or native (soluble) state by reacting them with chitin and glutaraldehyde. The reaction is generally conducted in an aqueous medium, and preferably the chitin and glutaraldehyde are sequentially reacted with the starting enzyme added to the reaction mixture.

For the sake of brevity, the insolubilized (immobilized) enzyme products of the invention are referred to by the term "enzyme-CG," and specifically as "lactase-CG," "amylase-CG," and the like.

It should be noted that both chitin and glutaraldehyde are essential to form the products of the invention. If chitin alone is used, the enzyme easily washes away, and the activity is lost. Moreover, if glutaraldehyde alone is used, great difficulty is encountered in forming an insolubilized product, particularly from a crude starting material. In sum, it is necessary to employ both chitin and glutaraldehyde, whereby to readily attain products which are stable to repeated use, that is, which retain their activity even when used over and over again.

The invention provides many important advantages, typical examples of which are outlined below.

A primary advantage of the products of the invention is that their activity is retained over long periods of use. For instance, a particular product of the invention (lactase-OG) was used continuously for over 2 weeks under conditions where the ratio of processed substrate to enzyme reaction product was over 850 to 1, and the lactase-CG still retained 80.6% of its original activity. Thus, the products of the invention have the advantage not only of being reusable, but also usable under conditions of continuous operations for long periods of time and with large amounts of substrates.

Another advantage of the invention is that the chitin not only contributes to insolubilization of the enzyme applied thereto, but also provides useful physical properties to the product. In particular, the chitin acts as a support or carrier so that the insolubilized enzyme product forms a column through which water and other liquids can percolate readily. This is in sharp contrast to known insolubilized enzymes which are generally amorphous materials that cannot be used directly in a column because liquids will not flow therethrough. These known products require the addition of a carrier such as diatomaceous earth, crushed firebrick, or the like to provide a liquid-permeable mass.

Another advantage of the invention is that the products are afforded by simple procedures using readily-available reactants. No exotic chemicals or complicated procedures are required. Nonetheless, the products retain a significant and sufficient part of the activity of the starting enzyme. In some cases, the major part of the original activity is retained.

A further advantage of the invention is that useful products can be prepared from any enzyme source, including pure enzymes, enzyme concentrates, crude enzyme preparations, and even such substances as animal organs, plant parts, microbial cultures, and the like. Important in this regard is that application of the herein-described reactants causes most of the active enzyme to be selectively precipitated even where it is present in minute quantity, e.g., as little as 1 mg. of active enzyme in association with gram quantities of inactive components. Accordingly, the invention provides the means for preparing insolubilized products from enzymes which previously were difficult to insolubilize or which were never insolubilized.

Another advantage of the invention lies in the precise control that one can exercise over the extent and direction of enzymic reactions. This results because of the solid nature of the products of the invention which allows specific amounts to be metered out to suit any particular situation.

Another advantage of the invention is that enzymic reactions can be stopped at any desired time by simply separating the solution under treatment from the insolubilized enzyme—for example, by draining the solution away from the reaction system. Thus, no external forces—such as heat, acid, and the like which might be detrimental—need be applied to short-stop the reaction.

Another advantage of the invention is that chitin is waste material in the processing of sea foods, and therefore is inexpensive and available in large quantities. Thus the products of the invention can be produced more economically than where known insolubilizing agents are used.

A further advantage of the invention is explained as follows: Most enzymes have an optimum pH, that is, a pH value at which the enzyme exhibits maximum activity. We have found that insolubilizing an enzyme in accordance with the invention produces a shift in this optimum pH, generally to a lower value. This particular aspect of the invention is quite important where an acidic food product (e.g., a fruit juice) is to be treated enzymatically, since it yields efficient results with enzymes which normally would operate inefficiently at the low pH provided by the acidic food.

DETAILED DESCRIPTION OF THE INVENTION

Preparation of the products of the invention involves reaction of the starting enzyme with chitin and glutaraldehyde. In a preferred embodiment of the invention, the starting enzyme is first adsorbed on chitin and the chitin-enzyme complex is then treated with glutaraldehyde. Alternatively, chitin may be first treated with glutaraldehyde and then with the enzyme. Water is advantageously used as the reaction medium. Temperatures employed are generally ambient (room) temperature, or somewhat lower or higher, i.e., the range from 1° to 40° C. Conventional operations such as mild stirring or shaking are applied to attain good contact between reactants. The products are segregated by the usual mechanical procedures such as filtration, centrifugation, or decanting. For best results, the aqueous medium is adjusted to the pH at which the enzyme in question is soluble.

Chitin is a polysaccharide wherein the primary repeating unit in the molecule is 2-deoxy-2-(acetylamino)-glucose. In general, about one out of every six units is not acetylated.

Chitin is readily prepared by removing the impurities from shells of crab, shrimp, lobsters, crayfish, and the like, which are abundantly available from seafood processing plants. Methods for conducting the purification are set forth in a later portion of this description.

For use in the process of the invention the chitin should be in granular form, obtainable by conventional comminuting procedures. It is generally desirable to apply a sieving operation to remove fine particles and over-size particles, retaining those having a mesh size in the range about from 10 to 50 mesh.

Preferred procedures used in a practice of the invention are described below:

The enzyme to be insolubilized is dissolved in distilled water. Where necessary, the pH of the water is adjusted by conventional methods to a level at which the enzyme is soluble. Appropriate pH's to use with any particular enzyme are described in the literature. In many cases a pH of about 3 to 7 is employed. It may further be noted that oftentimes the starting material already contains a buffer or other pH-adjusting agent so that when it is mixed with water the resulting dispersion will exhibit a pH at which the enzyme is most soluble. This is particularly the case with commercially-available enzyme preparations. It is obvious that in such cases there is no need to apply any pH adjustment.

Following preparation of the aqueous solution of the starting material, a mechanical separation step such as filtration or decantation can be applied to remove fillers, debris, or other undissolved material.

Next, the aqueous dispersion of the starting enzyme is added to moist chitin. Generally, about 1–10 parts of crude enzyme per 100 parts of chitin are used. The mixture is gently agitated by conventional means such as shaking, stirring, or the like while being held for 5–10 minutes at a temperature of about 1° to 25° C. in order to cause the enzyme to be adsorbed on the chitin.

Having adsorbed the enzyme on the chitin, an aqueous solution of glutaraldehyde is added to the above suspension. The amount of glutaraldehyde is not critical. Usually, a large excess, e.g., 10–50 parts thereof per part of enzyme, is used; the unreacted residue is removed in a subsequent washing step.

The resulting mixture is held for a period of time to ensure formation of the enzyme-CG product. Usually, the mixture is held for a short period, about 30 minutes, at ambient temperature. Subsequently, the mixture is held for a period of about 8–24 hours in a cold room at about 1°–10° C. However, a somewhat shorter holding period can be realized if the holding is conducted at temperatures between 10°–25° C. The product is then collected by filtration and washed several times with distilled water to remove excess reagents. The so-prepared enzyme-CG is then ready for use.

Usually, the starting enzyme contains inactive proteins and it is desirable to remove these from the final product. To this end, the enzyme-CG is washed with distilled water for a long period, e.g., about 60 minutes. It is then soaked sequentially in (a) several volumes of 10–15% aqueous sodium chloride, (b) a potassium acetate buffer at pH 7, and, finally, (c) a potassium acetate buffer at a pH whereat the enzyme-CG exhibits maximum activity. The so-prepared and purified enzyme-CG is collected by filtration and is ready for use.

The invention is of wide versatility and can be applied to enzymes of all kinds, illustrative examples being alcohol dehydrogenase, amino acid oxidase, $\alpha$- and $\beta$-amylases, arginase, asparaginase, catalase, cellulase, chymotrypsin, collagenase, deoxyribonuclease, diaphorase, elastin, emulsin, ficin, glucose oxidase, histidase, hyaluronidase, invertase, lactase, peroxidase, phosphatases lipase, lipoxidase, lysozyme, papain, chymopapain, pepsin, pectin methyl esterase, polyphenol oxidase, rennin, ribonuclease, trypsin, tyrosinase, urease, etc. The starting enzyme need not be a purified substance but may be a preparation containing an enzyme. Thus, for example, one may employ microbial preparations which contain enzymes, typically, cultures or cells of yeasts, molds, bacteria, and the like. Other enzyme-containing preparations which may be applied to the process of the invention are such materials as animal organs, e.g., pancreas, liver, etc., insects and insect parts, barley malt, pineapple, papaya, etc.

The products of the invention can be utilized in a variety of ways. A few examples are provided below by way of illustration and not limitation.

One particular application of the invention concerns the disposition of whey, the watery part of milk left over from cheese manufacture. Currently, whey is discarded into rivers, lakes, and other bodies of water with detrimental effects on the environment. the biological oxygen demand (referred to in the art as B.O.D.) of the water is raised, thus producing an imbalance in nature. As corrective legislation is enacted, companies will be forced to pay a high price for disposal of whey by other means.

Protein can be separated from whey, leaving a material composed essentially of lactose. Although the protein is beneficial as a food supplement, the lactose cannot be utilized. Thus, recovery of protein from whey is uneconomical. However, as a result of the invention lactose can be efficiently converted into galactose and glucose. These sugars are useful as fermentation media, e.g., in the culturing of yeast. The combined monetary rewards for the protein and the hydrolyzed lactose would, therefore, make it advantageous for the cheese producer to retain the whey. Of course, this economical advantage must be considered with respect to the price the manufacturer would have to pay for disposal of the whey.

The following example describes the application of the invention to the aforementioned problem. First lactase-CG is prepared by the method described herein. Then, the protein is removed from the whey by conventional means, for instance, pre-treating the whey with the phenolic resin itself. The de-proteinized whey is pumped through a column containing the lactase-CG. The resulting galactose and glucose are collected in the effluent and used as desired.

The invention can also be applied for the modification of protein in beer, wine, fruit juices, etc., so that they will not become turbid upon standing. In this particular embodiment of the invention, protease-CG is prepared and mixed with the liquid, e.g., beer. After a time sufficient to allow the enzyme to attack the proteinaceous material, the mixture is centrifuged. The result is a clarified liquid which will not become cloudy when held under refrigeration. Alternately, a column packed with protease-CG may be used, and the beer to be clarified can be pumped through said column.

Other applications include hydrolyzing starch to glucose, inverting sucrose solutions for the manufacture of candy, conversion of glucose to fructose, de-glucosing egg whites, conversion of dilute alcohol solutions to vinegar, and the like.

It is believed that formation of the products of the invention involves absorption of the enzyme molecules on the chitin, the resulting complex being cross-linked by the glutaraldehyde. In this way, the enzyme becomes attached to a "rigid backbone." Said attachment can be between the amino, hydroxyl, or sulfhydryl groups of the enzyme and the hydroxyl and amino portions of the modified chitin and the aldehyde group of the glutaraldehyde.

EXAMPLE 1

Preparation of Lactase-CG

Run 1

To 5 g. of chitin particles (in a moist condition, about 50% water) was added 50 mg. of acid-tolerant lactase enzyme (a $\beta$-galactosidase) in 10 ml. of water. The mixture was swirled and then allowed to stand for 5 minutes. An aqueous glutaraldehyde solution was added to the above mixture until the final concentration of glutaraldehyde in the mixture was 2%. This mixture was held at ambient temperature for 30 minutes, and then held at about 5° C. for 8 hours.

The resulting lactase-CG was collected by filtration and while retained on a sintered glass funnel was back-washed with distilled water for 1 hour. The product was then serially soaked in several volumes of the following aqueous solutions: 2 N sodium chloride, 1 M potassium acetate (pH 7), and 0.1 M potassium acetate (pH 3).

The so-produced lactase-CG exhibited approximately 65% of the original enzyme activity. The pH at which the enzyme exhibited optimum activity was shifted from 4 in the case of the starting enzyme to between 3.0 and 3.5 for the lactase-CG.

Runs 2 and 3

Two runs were made as described in Run 1 except that the amount of starting enzyme was varied—in one case 100 mg., in the other 150 mg.

The activity of the products was measured in a shaker bath batch test at 40° C. with a 0.4 M lactose solution in a 0.1 M postaaium acetate buffer potassium 3). The production of glucose (moles per min. per g. of lactase-CG) was measured. The results are tabulated below.

| Run | Lactase-CG Lactase (mg) | Chitin (g) | Activity Micromoles of glucose produced per min. per gram of lactase-CG |
|---|---|---|---|
| 1 | 50 | 5 | 61 |
| 2 | 100 | 5 | 98 |
| 3 | 150 | 5 | 115 |

EXAMPLE 2

Use of Lactase-CG Column

Lactase-CG was prepared as described in Example 1, Run 1, and packed into a 1.2 cm. × 18 cm. jacketed column. The column was washed with 0.1 M potassium acetate solution (pH 3).

An aqueous lactose solution (4% in 0.1 M potassium acetate buffer at pH 3) was passed through the column at varying flow rates. The column temperature was varied by flowing water at a selected temperature through the column jacket. The extent of hydrolysis was determined by analyzing for glucose in the effluent.

The results are summarized below:

| Temperature 30° C. | | | |
|---|---|---|---|
| Flow, ml./min. | 0.5 | 1 | 2 |
| Hydrolysis, % | 34 | 26 | 21 |

| Temperature 40° C. | | | |
|---|---|---|---|
| Flow, ml./min. | 0.5 | 1 | 2 |
| Hydrolysis, % | 50 | 37 | 28 |

| Temperature 50° C. | | | |
|---|---|---|---|
| Flow, ml./min. | 0.5 | 1 | 2 |
| Hydrolysis, % | 63 | 51 | 40 |

EXAMPLE 3

Continuous Use of Lactase-CG Column

Lactase-CG prepared as described in Example 1, Run 2, was packed into a 9 mm. × 2.2 cm. jacketed column, and washed with 0.1 M potassium acetate solution (pH 3).

A lactose solution (4% in 0.1 M potassium acetate buffer at pH 3) was passed through the column at the rate of 60 ml. per hour and at a temperature of 45° C. The column was so operated continuously for a period of 3 days. The percent hydrolysis of lactose was determined at the end of each day of operation. The results are given below:

| Time days | Hydrolysis, % |
|---|---|
| 1 | 58.7 |
| 2 | 57.0 |
| 3 | 57.9 |

EXAMPLE 4

Preparation of Acid Phosphatase-CG

Acid phosphatase-CG was prepared in a manner similar to that described in Example 1, using 10 mg. of acid phosphatase per gram of moist chitin.

The activity of the so-prepared enzyme-CG was measured spectrophotometrically, using disodium p-nitrophenylphosphate as the substrate. The optimum rate of hydrolysis was 0.41 micromole per min. per gram of moist enzyme-CG at a pH between 4.5 and 5.0. This was approximately 20% of the activity of the enzyme in soluble form.

EXAMPLE 5

Preparation of α-Chymotrypsin-CG

α-Chymotrypsin was prepared by the procedure described in Example 1, using 10 mg. of α-chymotrypsin per gram of moist chitin.

The activity of the so-prepared enzyme-CG was measured with ATEE (N-acetyl-L-tyrosine ethyl ester) in a system of 0.01 M ATEE, 0.1 M calcium chloride, and an ionic strength of 0.3. The optimum rate of hydrolysis was 72 micromoles per min. per gram of moist enzyme-CG at a pH of 9.0. This activity was about 14% of the activity of the original enzyme.

EXAMPLE 6

Preparation of Protease-CG

Protease-CG was prepared, using as a starting material a broad-spectrum protease from *Streptomyces griseus*. The procedure of Example 1 was applied, using 10 mg. of protease per gram of moist chitin.

The activity of the protease-CG was determined on BAEE (benzoylargenine ethyl ether). Optimum activity occurred at pH 6 where the rate of hydrolysis of BAEE was 2.4 micromoles per min. per gram of moist enzyme-CG.

As noted above, chitin for use in accordance with the invention may be prepared from the shells of crabs, shrimp, and other shellfish. Such procedures are known in the art and have as their aim the separation of the chitin from other components of the shells, principally calcium carbonate and protein. Typically, one may proceed as follows: The shells are ground, moistened with water, and treated with aqueous acid (e.g., HCl) to decompose the calcium carbonate contained in the shell material. The acid is applied until the evolution of $CO_2$ is complete. Vacuum can be applied to ensure the complete removal of this gas. The treated shells are then thoroughly washed with water to remove all excess acid and soluble salts, e.g., calcium salts. The washed shell material is then treated with an aqueous solution containing about 25–30% of an aqueous alkali, such as NaOH or KOH. To ensure removal of all associated proteinous material, the alkaline solution is preferably applied under reflux conditions (about 100° C.) for several hours. After treatment with aqueous alkali, the chitin is washed thoroughly with water to remove all alkaline material.

In an alternative procedure, proteinous components are removed from the shell material by enzyme action rather than by alkali treatment. To this end the shell material is suspended in water to which is added a proteolytic enzyme such as "Pronase" (a broad-spectrum protease produced by *Streptomyces griseus*), with adjustment of the pH to that favoring optimum activity of the enzyme. After allowing the suspension to stand long enough for the proteinous material to be solubilized, the chitin is washed thoroughly with water.

Following removal of proteinous components, the chitin may be further treated to remove traces of pigments. To this end the chitin from above is washed with warm (about 50° C.) 1% aqueous sodium chloride followed by warm (about 50° C.) 1% aqueous acetic acid. After a final washing step with water, the chitin is collected by filtration.

The chitin used in the above examples was prepared as follows:

Crude ground crab shell was moistened with water and treated with 6 N hydrochloric acid until evolution of carbon dioxide was complete. After 1 hour the mixture was subjected to reduced pressure of 12 millimeters of mercury for an additional hour. The so-treated shell material was washed with water until free of acid (as determined with pH test papers).

The washed shell material (50 g.) was refluxed in 300 ml. of 5 N potassium hydroxide solution for 3.5 hours. After cooling, the chitin was washed thoroughly with water until free of alkali (as determined with pH test paper).

The so-treated chitin was washed with 1% sodium chloride at 50° C. followed by 1% acetic acid at 50° C. Finally, the chitin was washed thoroughly with water and recovered by filtration.

Having thus described our invention, we claim:

1. A process for preparing an insoluble but active enzyme, which comprises:
    a. dissolving a soluble enzyme in water,
    b. mixing the resulting solution with granules of chitin to cause the enzyme to be adsorbed by the chitin,
    c. contacting the chitin containing adsorbed enzyme with an aqueous solution of glutaraldehyde, and
    d. separating the resulting enzyme-chitinglutaraldehyde reaction product.

2. An insoluble but active enzyme comprising a complex of a soluble enzyme and chitin, cross-linked with glutaraldehyde.

3. The product of claim 2 wherein the enzyme is a sugar-hydrolyzing enzyme.

4. The product of claim 2 wherein the enzyme is lactase.

5. The product of claim 2 wherein the enzyme is a glucose-oxidizing enzyme.

6. The product of claim 2 wherein the enzyme is a protein-degrading enzyme.

7. The product of claim 2 wherein the enzyme is a hydrogen peroxide-degrading enzyme.

8. The product of claim 2 wherein the enzyme is a starch-hydrolyzing enzyme.

* * * * *